(12) United States Patent
Nakajima et al.

(10) Patent No.: US 10,697,568 B2
(45) Date of Patent: Jun. 30, 2020

(54) REFRIGERANT PIPE, METHOD OF MANUFACTURING THE REFRIGERANT PIPE, AND HEAT EXCHANGER INCLUDING THE REFRIGERANT PIPE

(71) Applicant: Mitsubishi Electric Corporation, Tokyo (JP)

(72) Inventors: Takashi Nakajima, Tokyo (JP); Nobuaki Miyake, Tokyo (JP); Yudai Morikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 525 days.

(21) Appl. No.: 15/319,061

(22) PCT Filed: Sep. 25, 2014

(86) PCT No.: PCT/JP2014/075372
§ 371 (c)(1),
(2) Date: Dec. 15, 2016

(87) PCT Pub. No.: WO2016/046926
PCT Pub. Date: Mar. 31, 2016

(65) Prior Publication Data
US 2017/0114932 A1    Apr. 27, 2017

(51) Int. Cl.
*F16L 13/08* (2006.01)
*F28F 21/08* (2006.01)
(Continued)

(52) U.S. Cl.
CPC .............. *F16L 13/08* (2013.01); *B23K 1/008* (2013.01); *B23K 1/0012* (2013.01); *B23K 1/18* (2013.01);
(Continued)

(58) Field of Classification Search
CPC ......... F16L 13/08; F28F 9/182; B23K 1/0012
(Continued)

(56) References Cited

U.S. PATENT DOCUMENTS 2,017,154 A * 10/1935 Larkin ...................... F01L 3/22
123/188.8
2,429,888 A * 10/1947 Moore ................. B23K 1/0012
138/97
(Continued)

FOREIGN PATENT DOCUMENTS

GB          1512961 A     6/1978
JP          51-722 B      1/1976
(Continued)

OTHER PUBLICATIONS

Office Action dated Aug. 8, 2017 issued in corresponding JP patent application No. 2016-549831 (and English translation).
(Continued)

*Primary Examiner* — David Bochna
(74) *Attorney, Agent, or Firm* — Posz Law Group, PLC

(57) ABSTRACT

A refrigerant pipe is provided to be capable of preventing a change in a length by which the refrigerant pipe is inserted after the refrigerant pipe is inserted. The refrigerant pipe includes a heat-exchanger-side pipe having a pipe component insertion flare formed at an end portion of the heat-exchanger-side pipe and at least one protrusion formed on an inner peripheral portion of the pipe component insertion flare, and a pipe component having a smaller outer diameter than an inner diameter of the pipe component insertion flare. A height of the at least one protrusion is greater than a dimension of a clearance defined on the basis of a difference between the inner diameter of the pipe component insertion flare and the outer diameter of the pipe component. The pipe component is inserted into the pipe component insertion
(Continued)

US 10,697,568 B2

Page 2 flare, and the pipe component has a groove formed by the at least one protrusion.

10 Claims, 6 Drawing Sheets

(51) Int. Cl.
*F28F 9/18* (2006.01)
*B23K 1/00* (2006.01)
*B23K 33/00* (2006.01)
*B23K 1/008* (2006.01)
*B23K 1/19* (2006.01)
*B23K 1/18* (2006.01)
*F28F 1/32* (2006.01)
*F28D 1/047* (2006.01)
*F28D 21/00* (2006.01)
*B23K 101/14* (2006.01)
*B23K 103/10* (2006.01)

(52) U.S. Cl.
CPC .............. *B23K 1/19* (2013.01); *B23K 33/006* (2013.01); *F28F 9/182* (2013.01); *F28F 21/084* (2013.01); *B23K 2101/14* (2018.08); *B23K 2103/10* (2018.08); *F28D 1/0475* (2013.01); *F28D 2021/0068* (2013.01); *F28F 1/32* (2013.01); *F28F 2275/045* (2013.01)

(58) Field of Classification Search
USPC ......................................................... 285/382
See application file for complete search history.

(56) References Cited

U.S. PATENT DOCUMENTS

| 3,466,738 | A | * | 9/1969 | Mount | B21D 39/04 |
| | | | | | 285/18 |
| 3,602,531 | A | * | 8/1971 | Patry | F16L 21/002 |
| | | | | | 285/148.23 |
| 3,823,464 | A | * | 7/1974 | Chartet | B21D 39/06 |
| | | | | | 228/136 |
| 3,833,986 | A | * | 9/1974 | DeCicco | B21D 53/085 |
| | | | | | 29/890.047 |
| 3,957,289 | A | * | 5/1976 | Kilgore | B23K 1/0012 |
| | | | | | 285/22 |
| 3,993,236 | A | * | 11/1976 | Antonevich | B23K 1/0012 |
| | | | | | 228/111.5 |
| 4,077,559 | A | * | 3/1978 | Watson, Jr. | B23K 1/0012 |
| | | | | | 228/154 |
| 5,101,889 | A | * | 4/1992 | Potier | B23K 1/0012 |
| | | | | | 165/150 |
| 5,301,877 | A | * | 4/1994 | Madison | B05B 15/65 |
| | | | | | 239/154 |
| 5,398,981 | A | * | 3/1995 | Barton | F16L 25/10 |
| | | | | | 285/382 |
| 5,400,951 | A | * | 3/1995 | Shiroyama | B23K 33/004 |
| | | | | | 228/168 |
| 5,769,465 | A | * | 6/1998 | Schultz | F16L 13/141 |
| | | | | | 285/328 |
| 6,631,740 | B1 | * | 10/2003 | Jackson | F16L 13/08 |
| | | | | | 138/109 |
| 2001/0018970 | A1 | * | 9/2001 | Nakado | F28D 1/0316 |
| | | | | | 165/174 |
| 2010/0139094 | A1 | * | 6/2010 | Branyon | B21D 53/08 |
| | | | | | 29/890.043 |
| 2013/0319569 | A1 | * | 12/2013 | Kikuno | B23K 1/0012 |
| | | | | | 138/109 |
| 2015/0233499 | A1 | * | 8/2015 | Forst | F28F 9/0246 |
| | | | | | 165/76 |

FOREIGN PATENT DOCUMENTS

| JP | S63-104785 | A | | 7/1988 | |
| JP | 10-122449 | A | | 5/1998 | |
| JP | 11223485 | A | * | 8/1999 | ........... F28D 1/0341 |
| JP | 2008-164108 | A | | 7/2008 | |
| JP | 2008-212949 | A | | 9/2008 | |
| JP | 2014-139449 | A | | 7/2014 | |
| WO | WO-2017168747 | A1 | * | 10/2017 | ............... B23K 1/00 |

OTHER PUBLICATIONS

International Search Report of the International Searching Authority dated Jan. 6, 2015 for the corresponding international application No. PCT/JP2014/075372 (and English translation).
Examination Report dated Apr. 28, 2020 issued in corresponding GB patent application No. GB1621796.0.

* cited by examiner

REFRIGERANT PIPE, METHOD OF MANUFACTURING THE REFRIGERANT PIPE, AND HEAT EXCHANGER INCLUDING THE REFRIGERANT PIPE

CROSS REFERENCE TO RELATED APPLICATION

This application is a U.S. national stage application of PCT/JP2014/075372 filed on Sep. 25, 2014, the contents of which are incorporated herein by reference.

TECHNICAL FIELD

The present invention relates to a refrigerant pipe forming a refrigerant circuit of an air-conditioning apparatus, the method of manufacturing the refrigerant pipe, and a heat exchanger including the refrigerant pipe. In particular, the present invention relates to a connection mechanism of the refrigerant pipe.

BACKGROUND ART

In a conventional air-conditioning apparatus, cylindrical tubes mainly made of copper form a refrigerant circuit to circulate refrigerant between an outdoor unit and an indoor unit. Typically in this refrigerant circuit, passes are extremely long and are branched or joined complicatedly. For this reason, the copper pipes are, by brazing, often bonded together at each point of the refrigerant circuit. The point where two pipes are bonded together is often manually brazed using a hand burner by a worker. However, for the point where portions to be brazed are closely spaced, automatic brazing may be performed using an automatic brazing device. Examples of using automatic brazing include the case where many pipes are brazed to pipes of a heat exchanger.

At various portions to be brazed as described above, typically, one end of one pipe is inserted into one end of another pipe, a brazing material is supplied to portions in which both the pipes overlap with each other and then brazing is performed. In the most common method for such brazing, both original pipes have the same outer diameter, and a tip end of one of the pipes is expanded or narrowed. Subsequently, one of the pipes is inserted into the other pipe so that a slight clearance is left between one of the pipes and the expanded or narrowed tip end of the other pipe. Alternatively, both original pipes may have different outer diameters, and thus one of the pipes may be inserted into the other pipe by using a slight clearance between both original pipes without expanding or narrowing of the pipe. Also, one of the pipes may be expanded and another pipe may be narrowed, and then the narrowed pipe may be inserted into the expanded pipe.

To braze such pipes, various measures are taken depending on circumstances. The slight clearance is left between the pipes at a portion at which one of the pipes is inserted into the other one of the pipes as described above, and a molten brazing material is poured into the portion while the portion is being heated. Subsequently, heating is terminated to complete bonding by solidifying the brazing material. However, although an ideal clearance varies depending on the material and dimensions of pipes to be brazed and the type of a brazing material to be used, a typical clearance for pipes used for an air-conditioning apparatus is often between 0.1 mm and 0.2 mm. Further, the dimensions of the clearance need to be uniform across an entire circumference while one of the pipes is not obliquely inserted into the other one of the pipes.

As described above, the dimensions of the clearance between the pipes need to be constantly uniform across the entire circumference regardless of the type of an insertion process. In this case, at least one of the pipes targeted for insertion is provided with about three protrusions each having the same height as the dimension of the clearance, and the protrusions are provided in the circumferential direction of the pipe. With this configuration, a design has been proposed to match the axial centers of the pipes targeted for insertion (see Patent Literature 1, for example).

CITATION LIST

Patent Literature

Patent Literature 1: Japanese Unexamined Patent Application Publication No. 2008-164108 (Pages 3 to 5 and FIGS. 2 and 3)

SUMMARY OF INVENTION

Technical Problem

In the case where the clearance is left between the pipes at the portion of the conventional configuration at which one of the pipes is inserted into the other one of the pipes, when a force acts against the pipes to purposely or incidentally pull the pipes against each other before brazing and after the pipe insertion process, a problem occurs in that the one of the pipes cannot remain inserted and is detached from the other one of the pipes. When the pipe is completely detached before brazing, naturally, bonding by brazing cannot be performed. Further, even when the pipe is not completely detached, as an insertion depth becomes smaller than an original insertion depth, later-described defects may be caused in brazing.

Specific defect contents are different between the case of the preset insertion depth and the case of the smaller insertion depth. In the case of the smaller insertion depth, when a heat input amount to the brazed portion in brazing with a burner is the same as that in the case of the preset insertion depth, because the heat capacity of each pipe of the brazed portion is relatively lower, a temperature greatly increases. Depending on circumstances, a defective product may be formed due to pipe melting. This possibility is particularly high in the case of automatic brazing in which, depending on the heat capacity of the portion of the pipe to be brazed, a heating amount is relatively difficult to be adjusted each time. Moreover, the possibility is particularly high in the case of an aluminum pipe because a difference in melting point between a brazing material and a pipe is smaller than in the case of a pipe made of other type of metal.

The present invention has been made to solve the above-described problems, and is intended to provide a refrigerant pipe capable of preventing a change in a length by which the refrigerant pipe is inserted after the refrigerant pipe is inserted, the method of manufacturing the refrigerant pipe, and a heat exchanger including the refrigerant pipe.

Solution to Problem

A refrigerant pipe of an embodiment of the present invention includes a heat-exchanger-side pipe having a pipe component insertion flare formed at an end portion of the heat-exchanger-side pipe and at least one protrusion formed on an inner peripheral portion of the pipe component insertion flare, and a pipe component having a smaller outer diameter than an inner diameter of the pipe component insertion flare. A height of the at least one protrusion is greater than a dimension of a clearance defined on the basis of a difference between the inner diameter of the pipe component insertion flare and the outer diameter of the pipe component. The pipe component is inserted into the pipe component insertion flare, and the pipe component has a groove formed by the at least one protrusion. The pipe component is held by the heat-exchanger-side pipe with the at least one protrusion and the groove that are in contact with each other.

Advantageous Effects of Invention

According to the embodiment of the present invention, the protrusion formed on the inner peripheral portion of the pipe component insertion flare is configured to be larger than the dimension of the clearance defined on the basis of the difference between the inner diameter of the pipe component insertion flare and the outer diameter of the pipe component. Moreover, when the pipe component is inserted into the pipe component insertion flare, the protrusion forms the groove at the pipe component including no protrusion. With this configuration, even when the force acts against the pipes to purposely or incidentally pull the pipes against each other after the pipe component is inserted into the pipe component insertion flare, the groove and the protrusion come into press contact with each other, and thus the one of the pipes can remain inserted into the other one of the pipes. As a result, an effect can be obtained to perform stable brazing.

DESCRIPTION OF EMBODIMENTS

Embodiment 1

In Embodiment 1, a configuration in which a heat exchanger 1 formed using aluminum pipes and pipe components 2 made of aluminum are attached by brazing will be described.

First, the configuration of the heat exchanger 1 and the pipe components 2 will be described.

Figure 1:
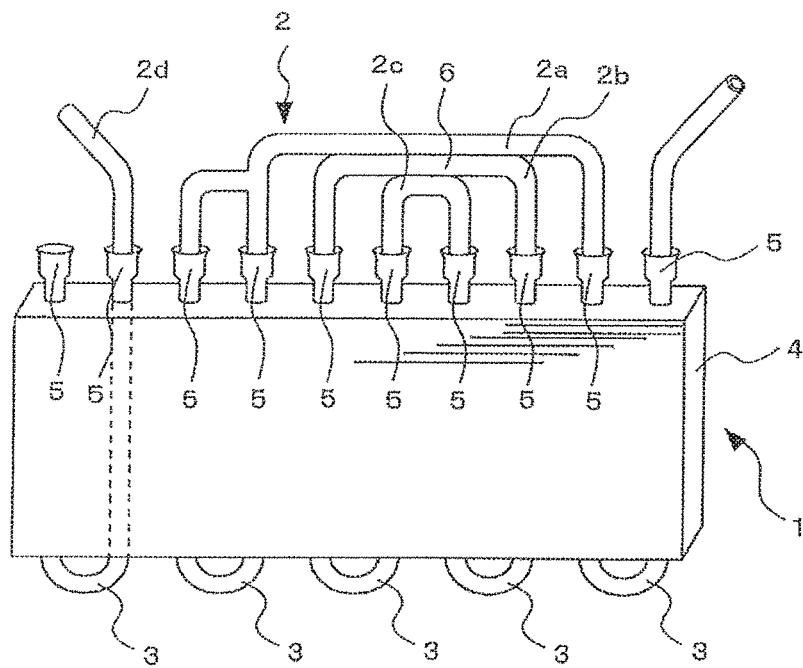
FIG. 1 is a perspective view of a bonded product of a heat exchanger and pipe components in Embodiment 1 of the present invention.

FIG. 1 is a perspective view of a bonded product of the heat exchanger 1 and the pipe components 2 in Embodiment 1 of the present invention. As illustrated in FIG. 1, the heat exchanger 1 includes a plurality of heat-exchange-side pipes 3 through which refrigerant flows, and fins 4 configured to exchange heat with a medium around the fins 4. A tip end of each heat-exchange-side pipe 3 is referred to as a pipe attachment port 5. The pipe components 2 through which refrigerant flows includes four pipes of a pipe component 2a, a pipe component 2b, a pipe component 2c, and a pipe component 2d. In the present embodiment, the pipe component 2a is in a three-pronged shape, and each of the pipe component 2b and the pipe component 2c is in a two-pronged shape. Each pipe port of these components is attached to a corresponding one of the pipe attachment ports 5. Moreover, the pipe component 2d is in a two-pronged shape. Only one of pipe ports of the pipe component 2d is connected to one of the pipe attachment ports 5, and the other pipe port of the pipe component 2d is a free end that is not connected to the heat exchanger 1. The pipe component 2a, the pipe component 2b, and the pipe component 2c are designed to contact each other at a pipe component center portion 6.

Note that each heat-exchange-side pipe 3 corresponds to a "heat-exchanger-side pipe" in the present invention.

Next, a bonded portion between the heat exchanger 1 and the pipe components 2 will be described in detail.

Figure 2:
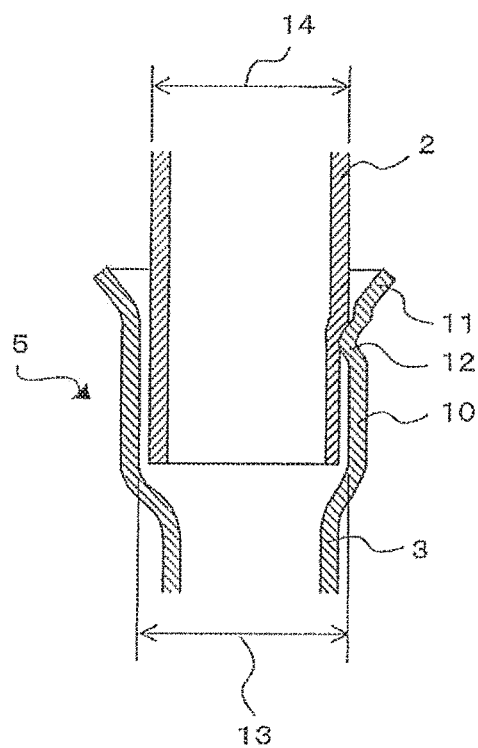
FIG. 2 is a longitudinal sectional view of a brazed portion of a pipe in Embodiment 1 of the present invention.

FIG. 2 is a longitudinal sectional view of a brazed portion of the pipe in Embodiment 1 of the present invention. As illustrated in FIG. 2, a pipe component insertion flare 10 having an end subjected to pipe expansion processing, for example, is provided at the pipe attachment port 5 of the tip end of the heat-exchange-side pipe 3. Further, a brazing material receiving flare 11 subjected to the pipe expansion processing is provided at a tip end portion of the pipe component insertion flare 10. In addition, protrusions 12 are provided on an inner peripheral portion of the pipe component insertion flare 10 adjacent to the brazing material receiving flare 11. The inner diameter of the pipe component insertion flare 10 of the heat-exchange-side pipe 3 is referred to as a heat-exchange-side pipe inner diameter 13. The outer diameter of the pipe component 2 is referred to as a pipe component outer diameter 14.

Figure 3:
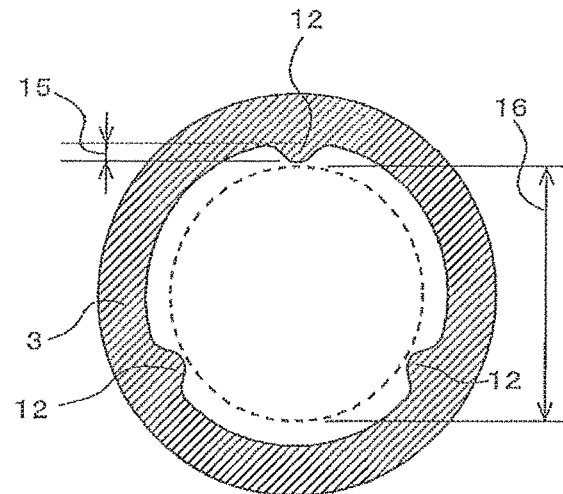
FIG. 3 is a cross-sectional view of a heat-exchange-side pipe horizontal to a pipe axis of a portion provided with protrusions in Embodiment 1 of the present invention.

FIG. 3 is a cross-sectional view of the heat-exchange-side pipe 3 horizontal to a pipe axis of a portion provided with the protrusions 12 in Embodiment 1 of the present invention. As illustrated in FIG. 3, on an inner peripheral portion of the heat-exchange-side pipe 3, the protrusions 12 having the same shape each are formed at an equal interval of 120 degrees about the center of the heat-exchange-side pipe 3. The standing height of the protrusion 12 is referred to as a protrusion height 15, and the diameter of an inscribed circle formed in a tubular cross section of a portion of the heat-exchange-side pipe 3 including three protrusions 12 is referred to as an inner protrusion diameter 16.

Note that, in Embodiment 1, the case where, on the inner peripheral portion of the heat-exchange-side pipe 3, the protrusions 12 having the same shape each are formed at an equal interval of 120 degrees about the center of the heat-exchange-side pipe 3 has been described, but the present invention is not limited to such a case. Four or more protrusions 12 may be provided.

A relation among the above-described three diameters can be shown as the relation of the heat-exchange-side pipe inner diameter 13>the pipe component outer diameter 14 and the relation of the pipe component outer diameter 14>the inner protrusion diameter 16. With such a relation, when the pipe component 2 is inserted into the heat-exchange-side pipe 3, a clearance in which a brazing material 19 is to be poured is left between the pipe component 2 and the heat-exchange-side pipe 3. Moreover, a portion of the pipe component 2 is pressed by the protrusion 12 while the pipe component 2 is inserted, and thus a groove is formed.

Figure 4:
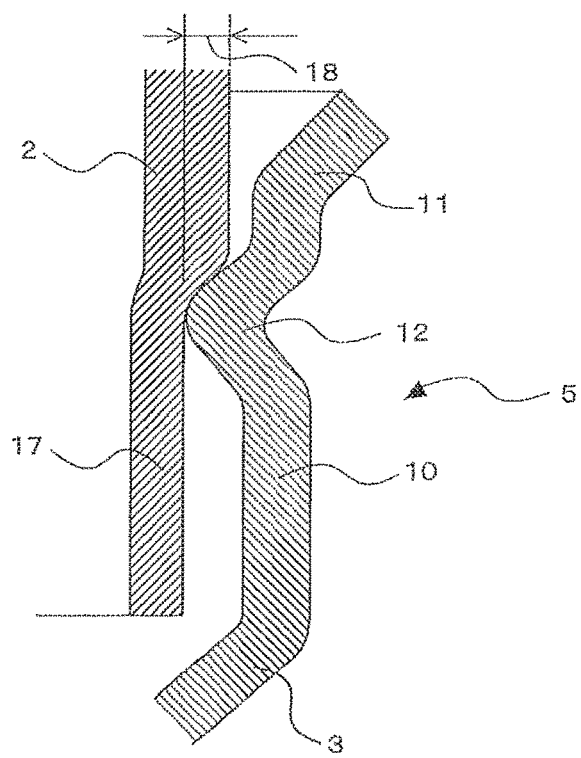
FIG. 4 is an enlarged view of the periphery of the protrusion of FIG. 2 in Embodiment 1 of the present invention.

FIG. 4 is an enlarged view of the periphery of the protrusion 12 of FIG. 2 in Embodiment 1 of the present invention. As illustrated in FIG. 4, the portion pressed by the protrusion 12 is referred to as a protrusion pressing portion 17. Moreover, a dimension of the portion of the pipe component 2 pressed by the protrusion 12 is referred to as a pressing allowance 18.

Figure 5:
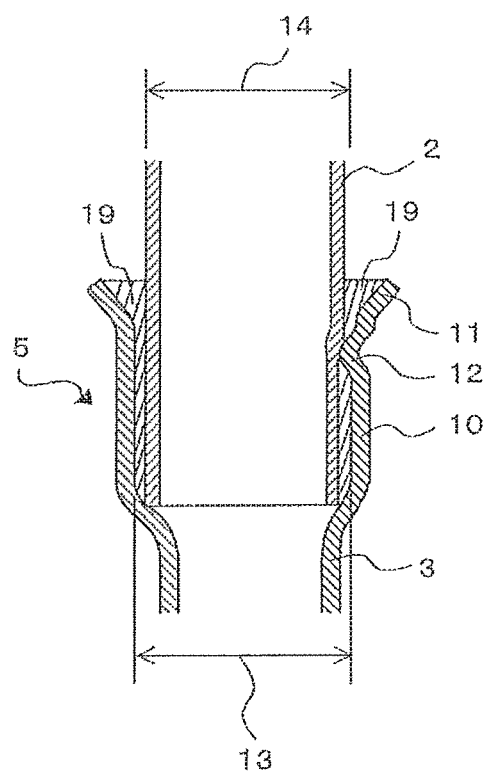
FIG. 5 is a view of a brazed pipe state in Embodiment 1 of the present invention.

FIG. 5 is a view of a brazed pipe state in Embodiment 1 of the present invention. As illustrated in FIG. 5, after the pipe component 2 is inserted into the heat-exchange-side pipe 3, brazing is performed by heating a portion to be brazed with a burner while the brazing material 19 is being supplied to the clearance between the heat-exchange-side pipe 3 and the pipe component 2. Alternatively, brazing is performed through heating by positioning, in a furnace, the entirety of the heat exchanger 1 and the pipe component 2 in which the brazing material 19 is placed on the portion to be brazed. At this point, the force to pull the inserted pipes against each other may act due to various factors after the process for inserting the pipe and before completion of brazing. A specific example of such force action will be described below.

For example, a case is assumed where the pipe component 2a, the pipe component 2b, and the pipe component 2c contact each other at the pipe component center portion 6. As described above, a clearance between adjacent ones of these pipe components is 0 mm in the design stage, but due to variation in manufactured pipes, the shapes of the pipe component 2a, the pipe component 2b, and the pipe component 2c do not always have dimensions as designed.

A difference in the state in which the pipe components 2 are inserted into the heat exchanger 1 between the case of the pipe components 2 having the dimensions as designed and the case of pipe components 2 not having the dimensions as designed will be described with reference to FIGS. 6 and 7.

Figure 6:
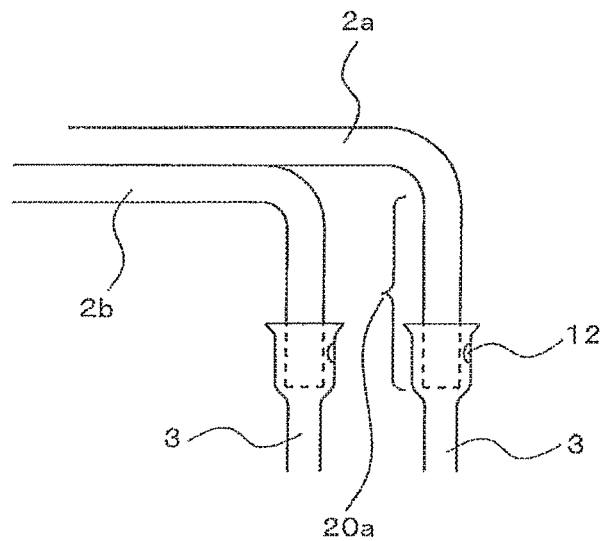
FIG. 6 is a view in the state in which the pipe components are inserted into the heat exchanger in Embodiment 1 of the present invention.
Figure 7:
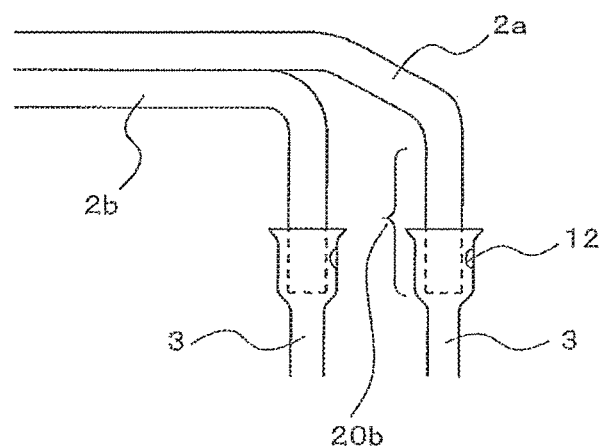
FIG. 7 is a view in the state in which deformed pipes of the pipe components are inserted into the heat exchanger in Embodiment 1 of the present invention.

FIG. 6 is a view in the state in which the pipe components 2 are inserted into the heat exchanger 1 in Embodiment 1 of the present invention. Moreover, FIG. 7 is a view in the state in which the deformed pipes of the pipe components 2 are inserted into the heat exchanger 1 in Embodiment 1 of the present invention.

As illustrated in FIG. 6, in the case where the pipe component 2 is produced to have the dimensions as designed in an original drawing, the pipe component 2a is inserted into the heat-exchange-side pipe 3 by a preset length. On the other hand, due to variation in manufactured pipes, the length of a pipe end linear portion 20b of the pipe component 2a may be, as illustrated in FIG. 7, shorter than a pipe end linear portion 20a having a length as designed. In this case, when an attempt is made to insert the pipe component 2a into the heat exchanger 1 by the preset length, as long as this configuration is unchanged, the pipe component 2a comes into contact with the pipe component 2b. For this reason, the pipe component 2a needs to be deformed to be inserted by the preset length. In this case, the pipe component 2a is forcibly deformed, and as a result, the force to pull the already inserted pipes against each other is applied to return the pipe component Aa 2a to an original shape. However, the protrusions 12 of the heat-exchange-side pipe 3 bite into the grooves formed in the pipe component 2a, and thus, actually, the pipe component 2a remains inserted and is pulled out of the heat-exchange-side pipe 3.

When the protrusions 12 contact the pipe components 2, generally, the protrusions 12 are not crushed even in the pipe insertion process because of such a reason that the hardness of the material of the protrusion is improved by a work-hardening effect in protrusion processing to form the protrusions 12, and a rib effect is produced by the protrusions 12.

However, due to carrying of the heat exchanger 1 or application of some kind of impact after the pipe insertion process and before actual brazing, force in the direction in which the pipe component 2a is pulled out of the heat-exchange-side pipe 3 may be further applied. Moreover, due to deformation of the pipe component 2a by heating in brazing, the force to pull the pipe component 2a out of the heat-exchange-side pipe 3 may be further increased.

In Embodiment 1, all of the pipes are made of aluminum, and thus the protrusions 12 deeply bite the heat-exchange-side pipe 3 while the heat-exchange-side pipe 3 is easily manually being pressed by the protrusions 12. Thus, even when the force additionally acts to pull the pipes against each other, the effect is actually produced to prevent the pipe component 2a from being inserted into the heat-exchange-side pipe 3 by an insufficient length and from being detached from the heat-exchange-side pipe 3.

The above description illustrates that the material of the pipes is aluminum because, generally, an aluminum pipe can be inserted while the protrusions 12 is easily pressing another aluminum pipe and the pipes remain press-fitted. Thus, as long as the pipe can be inserted while the protrusions 12 are pressing the other pipe and the pipes remain press-fitted, the material is not limited to aluminum, and may be copper, titanium, or stainless steel, for example. Moreover, the pipes made of a combination of different materials such as aluminum and stainless steel may be inserted.

As described above, in Embodiment 1, a portion of the pipe component insertion flare 10 adjacent to the brazing material receiving flare 11 is provided with the protrusions 12. With this configuration, even when the pipe component 2 is inserted by a slight length, the protrusions 12 can bite the protrusion pressing portion 17 pressed by the pipe component 2, leading to the effect of preventing the pipe of the pipe component 2 from being inserted by an insufficient length and from being detached from the heat-exchange-side pipe 3. Moreover, the protrusion 12 pressure-contacts the protrusion pressing portion 17 pressed by the pipe component 2, leading to the effect of holding the pipe component 2 in the radial direction, the vertical direction, and the circumferential direction of the pipe component 2.

Moreover, in Embodiment 1, the protrusions 12 are, in the circumferential direction of the heat-exchange-side pipe 3, each formed at an equal interval of 120 degrees about the center of the heat-exchange-side pipe 3. With this configuration, the dimensions of the clearance formed when the pipe component 2 is inserted into the heat-exchange-side pipe 3, into which the brazing material 19 is poured, are uniform across the entire circumference. Thus, the effect is obtained to reduce defects in brazing, such as difficulty in pouring of the brazing material due to an extremely small clearance and occurrence of voids in the brazed material due to an extremely large clearance even when the brazing material flows.

Further, in Embodiment 1, the entire structure including the pipes and other components form the heat exchanger 1 as illustrated in FIG. 1. As described above, the pipes having various shapes are attached to the heat exchanger 1. This is because elaborate design is made to properly control the flow of refrigerant flowing in the heat exchanger 1 to improve heat exchange performance. According to the present invention, even when the pipes contact each other, the pipes are not detached and the pipes attached to the heat exchanger 1 can be stably bonded. Thus, the effect can be obtained to manufacture, with favorable productivity, the heat exchanger 1 having excellent heat exchange performance.

In addition, as the protrusions 12 form the protrusion pressing portion 17, the protrusions 12 are not broken even when each protrusion 12 is larger than the dimensions of the clearance between the pipes. Moreover, when the plurality of refrigerant pipes of the pipe components 2 inserted into the pipe component insertion flares 10 are manufactured, even if the heights of the protrusions 12 vary, the pressing allowance 18 of the protrusion pressing portion 17 changes not to change the clearance important for stable brazing. As described above, the effect can be obtained to cause the pipe component 2 to remain inserted even under action of the force to pull the pipes against each other.

Note that, in Embodiment 1, the inner peripheral end portion of the heat-exchange-side pipe 3 is provided with the protrusions 12, but the present invention is not limited to such a configuration. The effect can be obtained to prevent the pipe of the pipe component 2 from being inserted by an insufficient length and from being detached from the heat-exchange-side pipe 3 even when an outer peripheral portion of the pipe component 2 is provided with the protrusions 12. Moreover, as the brazing material receiving flare 11 is for guiding the pipe component 2 into the pipe component insertion flare 10, the effects similar to above can be obtained even when no brazing material receiving flare 11 is provided. Further, whether the tip ends of the pipe component 2 and the heat-exchange-side pipe 3 are of original pipe portions, are processed for pipe expansion, or are processed for pipe narrowing is not important to obtain the above-described effects.

Embodiment 2

A basic structure of a heat exchanger 1 of Embodiment 2 is similar to that of Embodiment 1, but is different from that of Embodiment 1 in that protrusion receivers 30 are provided at a pipe component 2 in addition to protrusions 12 provided at a heat-exchange-side pipe 3. Thus, in Embodiment 2, the differences from Embodiment 1 will be mainly described below.

Figure 8:
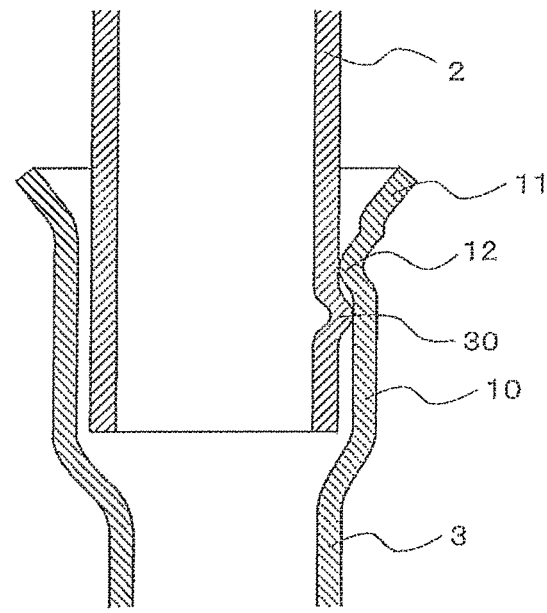
FIG. 8 is a longitudinal sectional view of a brazed portion of a pipe in Embodiment 2 of the present invention.

FIG. 8 is a longitudinal sectional view of a brazed portion of a pipe in Embodiment 2 of the present invention. As illustrated in FIG. 8, the pipe component 2 is provided with the protrusion receivers 30. When the pipe component 2 is inserted by a preset length, the protrusions 12 and the protrusion receivers 30 pass each other while contacting each other. Then, each protrusion 12 moves over a corresponding one of the protrusion receivers 30 so that the pipe component 2 is inserted.

Figure 9:
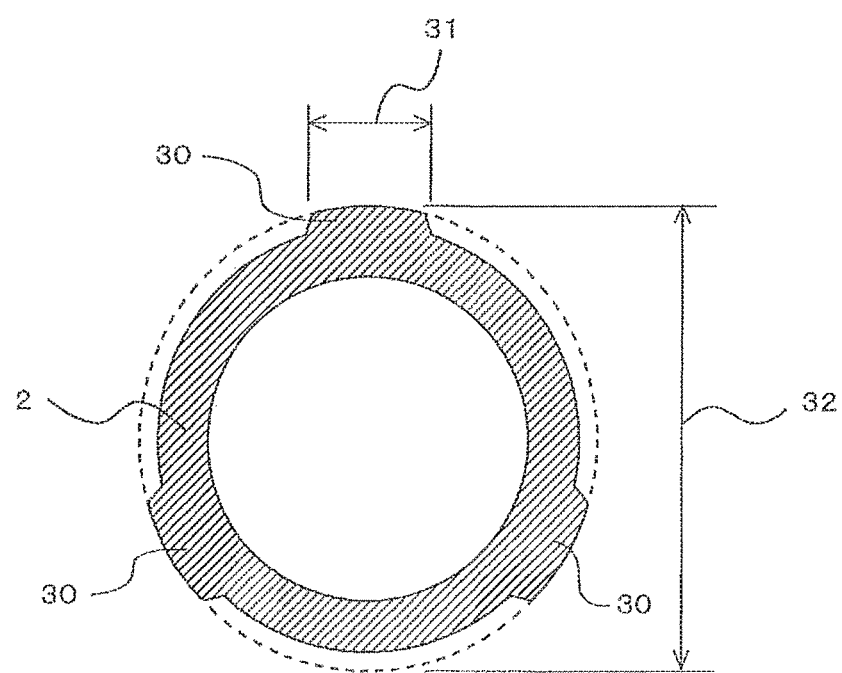
FIG. 9 is a cross-sectional view of a heat-exchange-side pipe horizontal to a pipe axis of a portion provided with protrusion receivers in Embodiment 2 of the present invention.

FIG. 9 is a cross-sectional view of the heat-exchange-side pipe 3 horizontal to a pipe axis of a portion provided with the protrusion receivers 30 in Embodiment 2 of the present invention. As illustrated in FIG. 9, on an outer peripheral portion of the pipe component 2, the protrusion receivers 30 having the same shape each are formed at an equal interval of 120 degrees, for example, about the center of the pipe component 2. In the present embodiment, the width of the protrusion receiver 30 is referred to as a protrusion receiver width 31. Moreover, the diameter of a circumscribed circle formed in a tubular cross section of a portion of the pipe component 2 including three protrusion receivers 30 is referred to as a protrusion receiver outer diameter 32.

Note that, in Embodiment 2, the example where the protrusion receivers 30 having the same shape are, on the outer peripheral portion of the pipe component 2, each formed at an equal interval of 120 degrees about the center of the pipe component 2 has been described, but the present invention is not limited to such an example. Four or more protrusion receivers 30 may be provided.

In this case, the following points need to be taken into consideration. When the pipe component 2 is attached to the heat-exchange-side pipe 3 of the heat exchanger 1, a certain degree of variation is caused in a rotation direction to pipe axes of the pipe component 2 and the heat-exchange-side pipe 3. Moreover, a certain degree of variation in positions in which the protrusions 12 and the protrusion receivers 30 are formed is caused. The protrusion receiver width 31 is set at such a sufficient width that at least one pair of the protrusion 12 and the protrusion receiver 30 can be, even with the above-described variations, at the same phase in a pipe circumferential direction.

The above-described sufficient width will be specifically described. A case is assumed where, in Embodiment 2, variation in the formation position of the protrusion 12 in the circumferential direction of the heat-exchange-side pipe 3 is ±5 degrees from an original position and variation in the formation position of the protrusion receiver 30 is also ±5 degrees. In this case, the width of the protrusion receiver 30 in the circumferential direction of the pipe component 2 is sufficient as long as the protrusion receiver 30 has an allowance of at least 10 degrees.

A relation between the protrusion receiver outer diameter 32 and an inner protrusion diameter 16 is set to the relation of the protrusion receiver outer diameter 32>the inner protrusion diameter 16. Moreover, in Embodiment 2, the relation of the pipe component outer diameter 14>the inner protrusion diameter 16 as in Embodiment 1 is not necessarily satisfied.

As described above, the outer peripheral portion of the pipe component 2 is provided with the protrusion receiver 30 and the heat-exchange-side pipe 3 is provided with the protrusions 12, the pipe is inserted while each protrusion 12 moves over a corresponding one of the protrusion receivers 30. In this case, the force to pull the pipe component 2 may act after the pipe component 2 is inserted into the heat-exchange-side pipe 3 by the preset length. However, even when the pipes actually move in the direction in which the pipes are pulled against each other, at least one of protrusions 12 contacts a corresponding one of the protrusion receivers 30 at a certain point, and thus great resistive force is produced against the force to pull the pipe component 2. With this configuration, the effect can be obtained to prevent the pipe of the pipe component 2 from being inserted by an insufficient length and from being detached from the heat-exchange-side pipe 3.

In Embodiment 2, the protrusions 12 are formed at the heat-exchange-side pipe 3, and the protrusion receivers 30 are formed at the pipe component 2. However, the present invention is not limited to such a configuration. Similar effects can be obtained even when the protrusion receivers 30 are formed at the heat-exchange-side pipe 3 and the protrusions 12 are formed at the pipe component 2.

Embodiment 3

A basic structure of Embodiment 3 is similar to that of Embodiment 1. Note that Embodiment 3 is different from Embodiment 1 in that a heat-exchange-side pipe 3 is not a cylindrical pipe but a flat pipe. Thus, the differences of Embodiment 3 from Embodiment 1 will be mainly described below.

Figure 10:
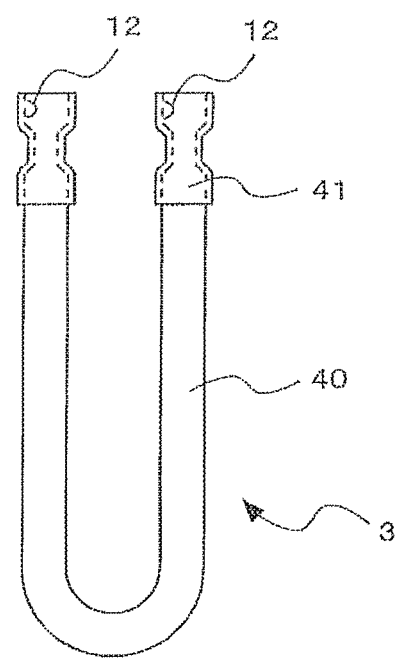
FIG. 10 is a view of the structure of a heat-exchange-side pipe of Embodiment 3 of the present invention.

FIG. 10 is a view of the structure of the heat-exchange-side pipe 3 of Embodiment 3 of the present invention. As illustrated in FIG. 10, not a cylindrical pipe but a flat pipe is used as a heat-exchange-side pipe body 40. Thus, a heat-exchange-side pipe tip end portion 41 is in such a complicated shape that the heat-exchange-side pipe body 40 that is the flat pipe is inserted into one end portion of the heat-exchange-side pipe tip end portion 41 and a cylindrical pipe is inserted into the other end portion of the heat-exchange-side pipe tip end portion 41.

A portion of the heat-exchange-side pipe 3 into which a pipe component 2 and the heat-exchange-side pipe body 40 are inserted, that is, the heat-exchange-side pipe tip end portion 41 including a protrusion 12, is pre-molded by pressing, for example. In a preceding process, the heat-exchange-side pipe body 40 and each heat-exchange-side pipe tip end portion 41 is bonded together. With this configuration, only the heat-exchange-side pipe tip end portion 41 in the relatively-complicated shape including the protrusion 12 and other parts can be separated and shaped even when the heat-exchange-side pipe 3 has a certain level of size. Thus, the effect can be obtained to improve productivity of an entire product.

REFERENCE SIGNS LIST 1 heat exchanger, 2 pipe component, 2a pipe component A, 2b pipe component B, 2c pipe component C, 2d pipe component D, 3 heat-exchange-side pipe, 4 fin, 5 pipe attachment port, 6 pipe component center portion, 10 pipe component insertion flare, 11 brazing material receiving flare, 12 protrusion, 13 heat-exchange-side pipe inner diameter, 14 pipe component outer diameter, 15 protrusion height, 16 inner protrusion diameter, 17 protrusion pressing portion, 18 pressing allowance, 19 brazing material, 20a pipe end linear portion, 20b pipe end linear portion, 30 protrusion receiver, 31 protrusion receiver width, 32 protrusion receiver outer diameter, 40 heat-exchange-side pipe body, 41 heat-exchange-side pipe tip end portion

The invention claimed is:
1. A refrigerant pipe comprising:
a heat-exchanger-side pipe having a pipe component insertion flare formed at an end portion of the heat-exchanger-side pipe and at least one protrusion formed on an inner peripheral surface of the pipe component insertion flare; and
a pipe component having a smaller outer diameter than an inner diameter of the pipe component insertion flare, wherein
a protrusion diameter, which is defined by a radially innermost point of the protrusion, is less than the outer diameter of the pipe component,
a distal end section of the pipe component is located inside the pipe component insertion flare and extends from a distal end of the pipe component to an entrance of the insertion flare when the pipe component is fully inserted in the pipe component insertion flare,
the pipe component has a groove formed by the at least one protrusion,
the pipe component is held by the heat-exchanger-side pipe with the at least one protrusion and the groove in contact with each other,
the distal end section of the pipe component is cylindrical and has a uniform outer diameter prior to being inserted into the pipe component insertion flare, and
the protrusion contacts the pipe component at a location spaced apart from the distal end of the pipe component.

2. The refrigerant pipe of claim 1, wherein a material of at least one of the heat-exchanger-side pipe and the pipe component is aluminum.

3. The refrigerant pipe of claim 1, wherein the at least one protrusion comprises three or more protrusions on the inner peripheral portion of the pipe component insertion flare.

4. The refrigerant pipe of claim 1, further comprising:
a brazing material receiving flare configured to guide the pipe component into the pipe component insertion flare,
wherein the at least one protrusion is provided on a portion of the pipe component insertion flare adjacent to the brazing material receiving flare.

5. The refrigerant pipe of claim 1, wherein
a protrusion receiver configured to engage with the at least one protrusion is provided on an outer peripheral portion of the pipe component, and
when the pipe component is inserted into the pipe component insertion flare, the protrusion receiver moves over the at least one protrusion.

6. The refrigerant pipe of claim 1, wherein the heat-exchanger-side pipe includes a main body and a separate body bonded to the main body, the separate body including a portion overlapping with the pipe component in a vicinity of the portion.

7. The refrigerant pipe of claim 1, wherein the pipe component and the heat-exchanger-side pipe are brazed to each other with a brazing material.

8. The refrigerant pipe of claim 1, further comprising a heat-exchanger-side pipe tip end portion having
one end into which the pipe component is inserted, and
another end bonded to the heat-exchanger-side pipe,
wherein the heat-exchanger-side pipe is a flat pipe.

9. A heat exchanger comprising:
a fin configured to transfer heat of refrigerant; and
the refrigerant pipe of claim 1,
wherein the refrigerant pipe penetrates the fin, and the refrigerant flows through the refrigerant pipe.

10. A method of manufacturing a refrigerant pipe, comprising:
providing a pipe component insertion flare at an end portion of a heat-exchanger-side pipe;
forming a protrusion on an inner peripheral portion of the pipe component insertion flare; and
inserting a distal end section of a pipe component into the pipe component insertion flare to cause the protrusion to form a groove on the pipe component and to press-contact the protrusion and the groove against each other to fix the pipe component,
wherein the distal end section of the pipe component extends from a distal end of the pipe component to an entrance of the insertion flare when the pipe component is fully inserted into the pipe component insertion flare, and the distal end section is cylindrical with a uniform outer diameter prior to being inserted into the pipe component insertion flare, and
wherein a protrusion diameter, which is defined by a radially innermost point of the protrusion, is less than an outer diameter of the pipe component.

* * * * *